United States Patent [19]

Blount

[11] 3,891,102

[45] June 24, 1975

[54] VEHICLE LOADING AND STORAGE SYSTEM FOR WHEELED CONTAINERS

[76] Inventor: Bobby J. Blount, 530 La Rue Way, El Cajon, Calif. 92021

[22] Filed: Mar. 7, 1973

[21] Appl. No.: 338,839

Related U.S. Application Data

[62] Division of Ser. No. 126,136, March 19, 1971, Pat. No. 3,752,336.

[52] U.S. Cl............ 214/75 T; 211/118; 248/119 R
[51] Int. Cl................................................ B60p 1/44
[58] Field of Search.... 214/75 R, 75 T, 75 H, 75 G; 211/113, 118, 184; 105/370, 371, 372, 376, 369; 248/119 R; 312/117, 118, 270

[56] References Cited
UNITED STATES PATENTS

| | | | |
|---|---|---|---|
| 1,601,990 | 10/1926 | Wann........................................ | 296/3 |
| 2,488,582 | 11/1949 | Cinamon................................. | 211/113 |
| 2,593,717 | 4/1952 | Barrott, Jr. et al. ................. | 214/75 R |
| 3,142,396 | 7/1964 | Pauley et al........................... | 214/75 T |
| 3,338,423 | 8/1967 | Wellman, Jr........................... | 211/148 |

Primary Examiner—Robert J. Spar
Assistant Examiner—Lawrence J. Oresky
Attorney, Agent, or Firm—Brown & Martin

[57] ABSTRACT

A vehicle loading and storage system for storing and loading containers within the body of the vehicle comprising a plurality of rows of tracks on at least two levels, each row of tracks being capable of storing a plurality of wheeled containers, and an elevator for raising the containers from ground level, or from a platform, to the height corresponding to the tracks for a given level. The tracks are foldable, or stowable, so as to make the vehicle convertible from the container carrying configuration to a conventional configuration. The folding configuration employs a plurality of track supporting members which pivot against the side wall of the vehicle. They are maintained in their supporting position by legs which also fold, and partially retract, to allow a compact folding action of the entire track structure against the side of the vehicle. The stowable configuration employs vertical members which are carried on an overhead longitudinal bar in the use position and stowed on a second overhead longitudinal bar adjacent the side of the vehicle in the stowed position.

4 Claims, 11 Drawing Figures

PATENTED JUN 24 1975  3,891,102

SHEET 2

VEHICLE LOADING AND STORAGE SYSTEM FOR WHEELED CONTAINERS

This is a division, of application Ser. No. 126,136, filed Mar. 19, 1971 now U.S. Pat. No. 3,752,336 issued Aug. 14, 1973.

BACKGROUND OF THE INVENTION

Wheeled carts or containers are frequently used, in many applications, to move a wide variety of articles from one point to another within a manufacturing facility, storage facility, or processing facility. These containers serve many useful purposes within the facilities. They are of a size which makes it possible for one man to push them about, and therefore are adaptable to a variety of handling tasks. In some instances they may be stationed next to a work space to receive a particular person's work output.

The U.S. Post Office Department and other mail handling facilities are examples of users of this type of cart. These facilities use these carts in large numbers to move bulk mail and packages from one station to another within a post office building. If often becomes necessary to ship the contents of these carts to another mail handling facility. Where the distances involved are not too great, the shipment is frequently accomplished by using a road vehicle. The normal practice when making such a shipment has been to load the mail from the carts into a number of sacks and thereafter to load the sacks onto the truck. At the destination post office, or other facility, the sacks must then be moved from the truck, and frequently the further processing which the mail will undergo, will dictate that the mail again be placed in carts.

Thus, the existing system for handling mail involves a considerable expenditure of time to effect the transfer of package and bulk mail from one facility to another since the mail must be moved from a container used within the post office facility, i.e., a cart, to a second container, i.e., a mail sack, and then again placed within carts upon arrival at the second facility. Additionally, the handling of the sacks is difficult, since they have no integral provision for wheels or other means which would facilitate their movement. Their handling therefore requires a large expenditure of man hours.

Thus if is desirable to have a system for transporting mail or other articles which will reduce the handling time and associated labor.

SUMMARY OF THE INVENTION

The system of this invention makes it possible to ship the carts or containers used within a facility directly, by providing for their efficient loading and storage within the body of a vehicle. The invention combines an elevator with container support structure to make it possible to load a plurality of levels of the carts within the vehicle body. Two exemplary embodiments of the storage structure are presented, both make provision for the utilization of the vehicle's interior to carry conventional cargo without substantial interference from the cart supporting structure.

The structure of both embodiments incorporate track means which support and guide the wheels of the carts longitudinally of the truck body and thereby provide additional levels of carts to fully utilize the interior of the truck body. The invention includes an elevator uniquely adapted to the handling of carts, and other wheeled containers, as required in the practice of the invention. The elevator is capable of raising carts from ground level or from the level of a loading dock, to the elevated level of carts within the truck bodies. The carts may then be pushed from the elevator onto the supporting rails. The elevator incorporates a frame, mounted for vertical movement, on rails adjacent the rear opening of the truck body. The frame carries a pivotally connected platform which is movable from a vertical position, for use during vehicle operation, to an extended position, where it is substantially horizontal for receiving the containers. A stop prevents rotation beyond the horizontal position.

The elevator is raised and lowered by two cables, that extend vertically from the frame, over a pair of pulleys at the top of the vehicle, and then to a suitable actuator, such as a hydraulic hoist, which may be located, for example, under the truck body. The elevator platform is of sufficient length to carry the same number of carts as there are rows of rails, so the carts can be raised to the level being filled, and pushed from the elevator platform to the track supports The support structure of the first embodiment of the invention is foldable for storage and is most suited to a vehicle body which has sufficient height to carry only two levels of carts. On each side of the truck there are a plurality of track support members which are pivotally mounted at their outboard ends. The members are supported in their horizontal or supporting position by a series of folding legs which pivot, from a nested position to a supporting position, and include an extendable portion which locks into place to support the member. The track support members on both sides of the truck can carry at least a pair of tracks. The tracks comprise L-shaped channel members which are spaced apart a distance corresponding to the spacing between the wheels of the carts so as to form a support therefor, and have their vertical legs arranged to maintain the carts on the tracks. If vehicle width permits, a third row of carts may be carried by incorporating a third channel member on each series of track support members extending longitudinally of the truck body to carry a plurality of carts at each row, on each level.

A second embodiment of the invention utilizes a modified cart support structure. This structure also has a supporting position and a stowed position but eliminates the need for track support members and carries the tracks on the sides of the vehicle and on vertical members which are carried by a bar mounted on the vehicle roof. The vehicle may be converted, from the configuration utilized for carrying carts, to that utilized when it is desired that the interior of the vehicle be open for loading of conventional cargo such as mail bags. The conversion is accomplished by moving the vertical members, on one or both sides, from the supporting bar to a storage bar located adjacent the sidewalls of the vehicle body. This movement leaves substantially the entire interior of the vehicle free for the loading of conventional cargo.

Both embodiments may employ a transition ramp, which bridges the gap between the outboard ends of the tracks and the elevator platform. The transition ramp is movable from an extended to a retracted position, whereby it may be retracted out of interference with the door mechanism which may be, for example, a sliding roll top door.

Both embodiments employ joints and connections which do not require the use of wrench type fasteners and so may be converted from the cart carrying to the conventional configuration without the use of tools, and in a minimum of time.

A vehicle employing the features of the invention may be loaded by simply backing it up to a loading dock or ground level loading facility and wheeling the carts or containers onto the elevator platform. If, for example, the vehicle uses three across rows of carts, three carts would be pushed onto the ramp in approximate alignment with the tracks on the ramps and the elevator mechanism actuated to raise the platform and carts to the approximate alignment with the transition ramps of the level being loaded. The ramp would then be extended into the immediate proximity of the elevator platform and the carts pushed by hand onto the rails. Additional carts would be loaded to the level in a similar manner with the added carts forcing the earlier positioned carts further into the truck body, until the level is entirely full of carts. The other levels of the truck would be loaded in a similar manner, until the vehicle has reached its full cart carrying capacity. Where vehicle road-width restrictions result in an aisle in the center of the vehicle which cannot accommodate carts, this area may be loaded with conventional mail sacks or other cargo. Similarly, in vehicles which are capable of utilizing their full width for cart storage, it may still be desirable, in some circumstances, to carry a mixed cargo. In this case, the support structure in one-half of the vehicle is stowed along the vehicle's sides and the volume thus freed, utilized for the conventional cargo.

Trucks utilizing the vehicle loading and storage system of the invention have been tested for their efficiency in transporting wheeled carts. A study testing this concept, was conducted by the Post Office Department. It determined that, in a metropolitan post office, and the surrounding area, many thousands of work hours could be saved in a typical two week period. Additionally, the study determined that the vehicle's utility for normal operation was substantially undiminished.

It is therefore an object of the invention to provide a new and improved vehicle loading and storage system for wheeled containers.

It is another object of the invention to provide a new and improved vehicle loading and storage system which reduces the man hours required to move a plurality of articles, from one location to another, when road vehicles are employed.

It is another object of the invention to provide a new and improved vehicle loading and storage system that is adaptable to convert existing vehicles to more efficient operation.

It is another object of the invention to provide a new and improved vehicle loading and storage system which does not substantially diminish the vehicle's capacity for normal operation.

It is another object of the invention to provide a new and improved vehicle loading and storage system which is low in cost and easy to install in a vehicle.

It is another object of the invention to provide a new and improved vehicle loading and storage system which is adaptable to the raising of the containers from loading levels of varying heights above ground.

It is another object of the invention to provide a new and improved vehicle loading and storage system which is susceptible of combined, normal, and container only operation.

These and other objects of the invention will become more apparent upon a reading of the following detailed description and an examination of the drawings, wherein like reference numberls refer to like parts throughout, and in which.

Figure 1:
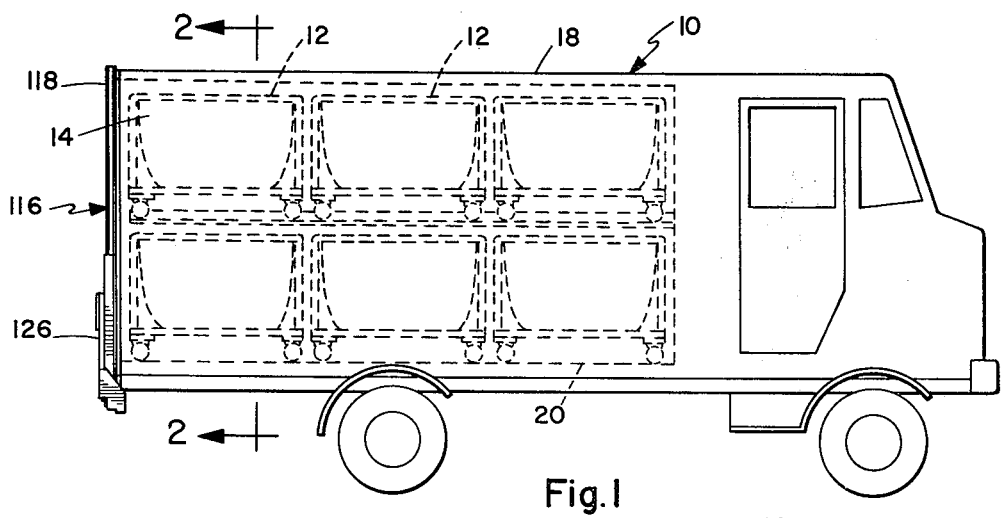
FIG. 1 is a side elevational view of a typical van type vehicle showing one cart arrangement.

Referring now to the figures, FIGS. 1 through 6 illustrate a first embodiment of the invention incorporating folding support structure. The structure is mounted in the body portion of a vehicle or truck 10. Supported within the vehicle are a plurality of containers or carts 12. The vehicle body is shown to include sidewalls 14 and 16, a roof portion 18, and floor portion 20. The folding cart support structure includes a plurality of rail support members 22 and 24 mounted along both sides of the vehicle interior. The mounting comprises a pivotal connection to vertical support members 26 and 28. The rail support members are maintained in their supporting position by foldable legs 30 and 32 which have retractable extensions 34 and 36. The rail support members, and the supporting structure are prepared for the folded condition by retracting these extensions through the use of the quick release 39, illustrated in FIG. 6. The quick release includes a pin 41 which is spring held by leaf spring 43 in a bore through the leg 30 and extension 34. The upturned end 45 of spring 43 is utilized to remove the pin, from at least the bore through extension 34, to permit the retraction of the extension within the leg 30. This reduces the overall length of the leg sufficiently to allow it to nest within the confines of the track support members, as illustrated in the full line section in FIG. 5.

Figure 4:
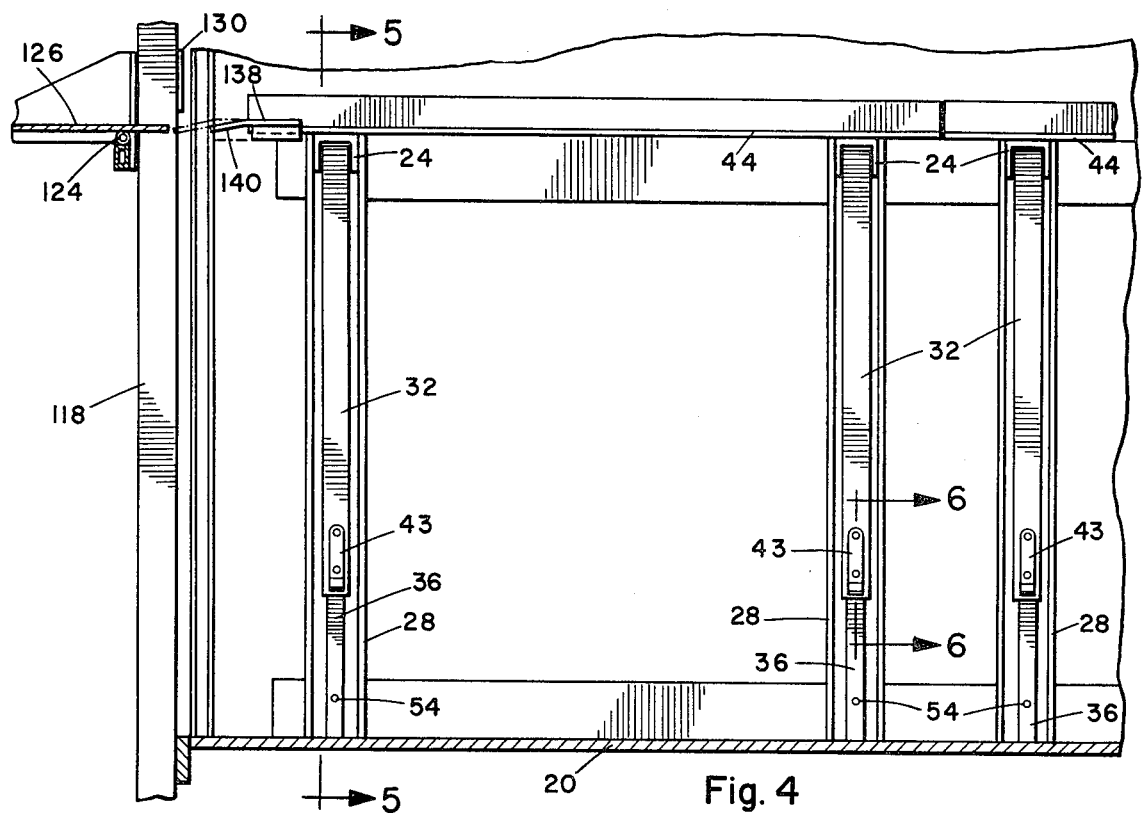
FIG. 4 is an enlarged sectional view taken on line 4—4 of FIG. 2.
Figure 5:
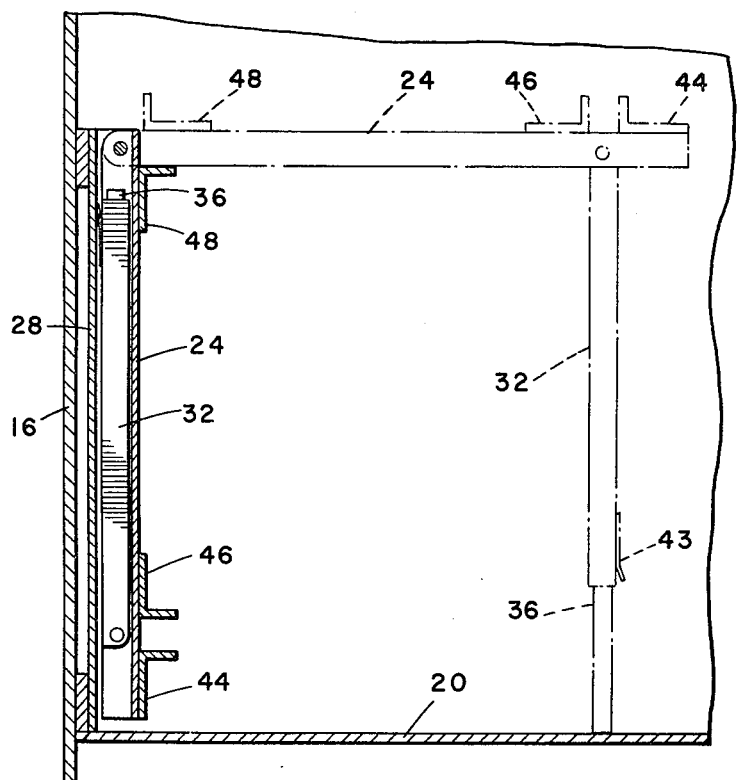
FIG. 5 is a sectional view taken on line 5—5 of FIG. 4.
Figure 6:
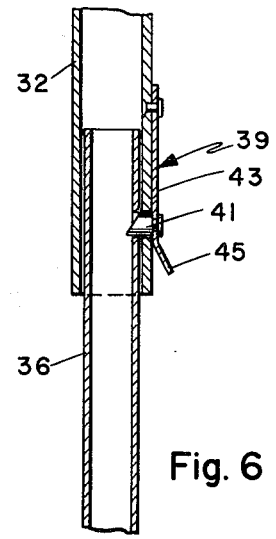
FIG. 6 is an enlarged sectional view taken on lines 6—6 of FIG. 4.

The rail support members of FIG. 1 are illustrated as carrying three rails on each side of the vehicle. Rail support members 22 carry a pair of rails 38 and 40 for a first row of carts and in addition the rail support members carry a third rail 42 which is utilized in conjunction with the third rail 44 carried on rail support member 24. Rail support members 24 also carry rails 46 and 48. The rails are all similarly configured of generally L-shaped channel members and have a horizontal or wheel supporting leg, as in leg 50 of rail 38, and a vertical or guide leg, as in leg 52, of rail 38. The rails extend longitudinally of the truck body as can best be seen in FIG. 1 or in the sectional view in FIG. 4. FIG. 4 also illustrates the second hole 54 in the extensions 34 used for maintaining the extension in the retracted position.

Figure 2:
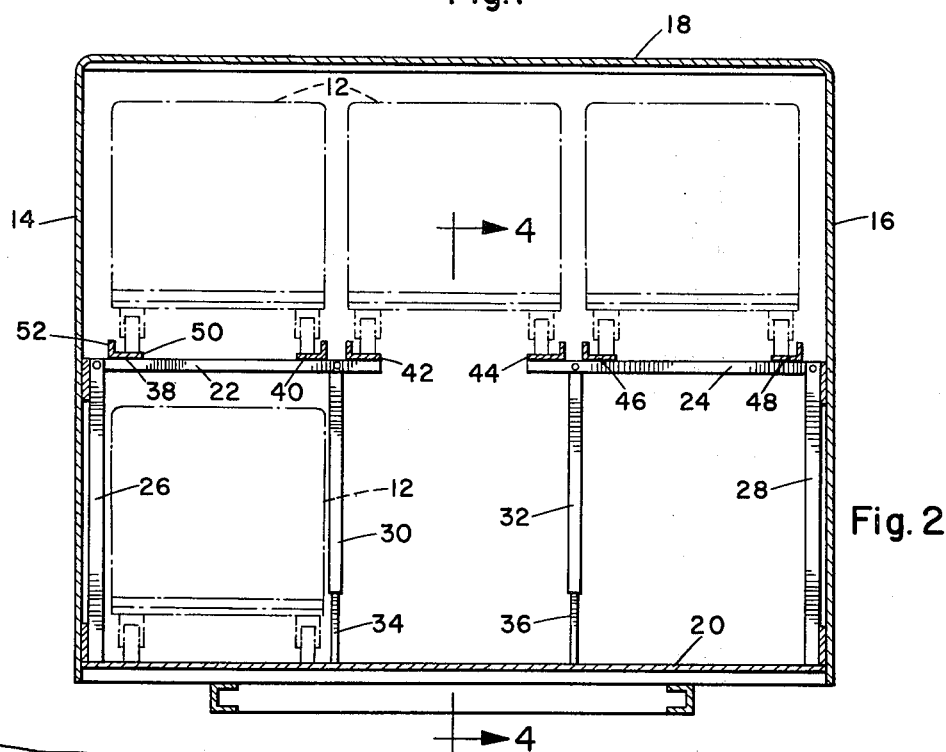
FIG. 2 is an enlarged sectional view taken on line 2—2 of FIG. 1.
Figure 3:
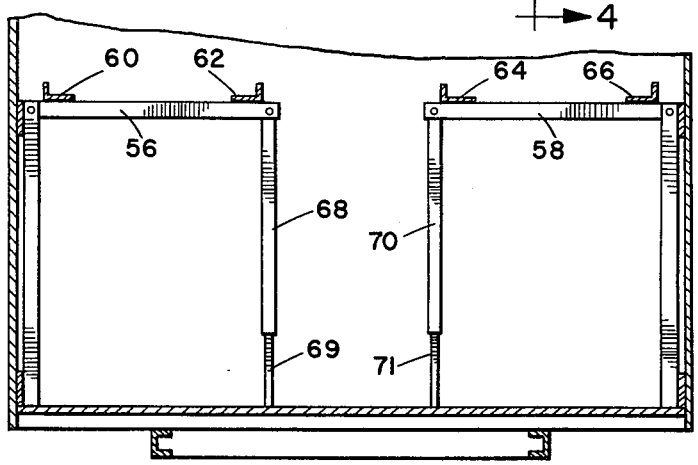
FIG. 3 is a sectional view similar to FIG. 2, showing an alternative arrangement for a narrower vehicle.

The modification of FIG. 3 utilizes substantially the same structure as that depicted in FIG. 2 but is particularly adapted for use in vehicles having insufficient width to accommodate three rows of carts. In this modification, the rail support members 56 and 58 support only a pair of tracks. Rail support member 56 carries tracks 60 and 62 and rail support member 58 carries tracks 64 and 66. The rail support members are pivotally mounted in the same manner as those in FIG. 2 and utilize legs 68 and 70 which include retractable extension 69 and 71 to permit the device to fold in the manner illustrated in FIG. 5.

Figure 10:
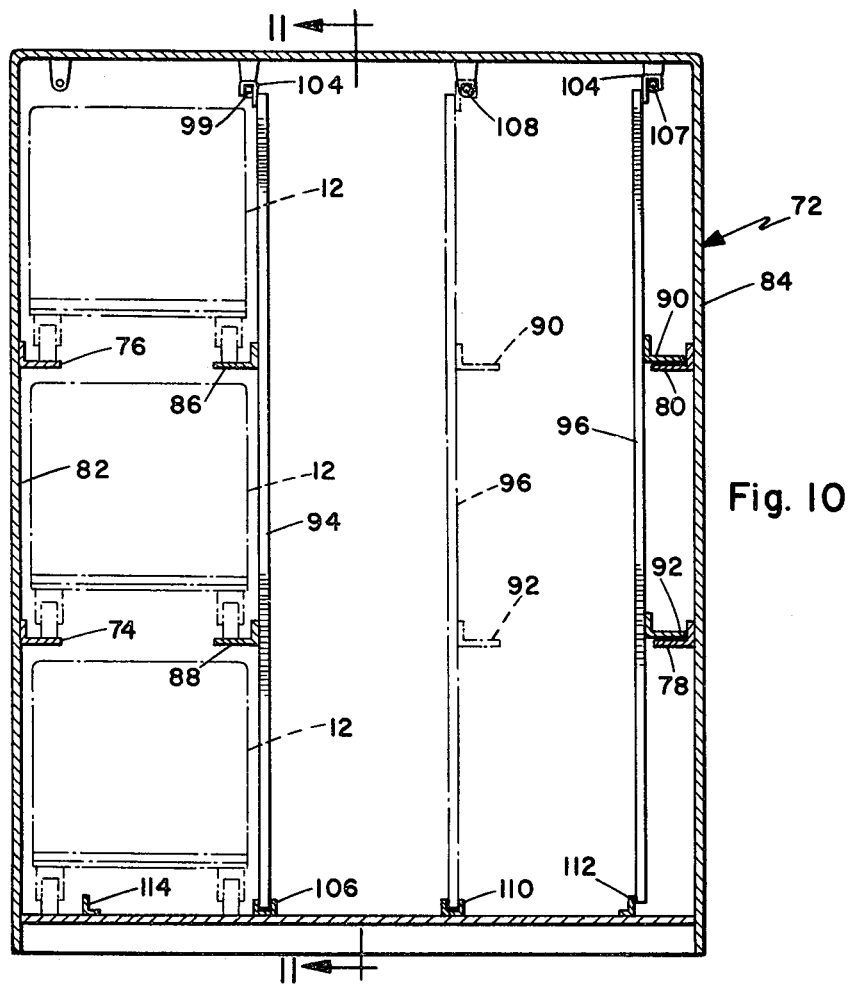
FIG. 10 is a sectional view similar to FIG. 2 showing an alternative cart arrangement.
Figure 11:
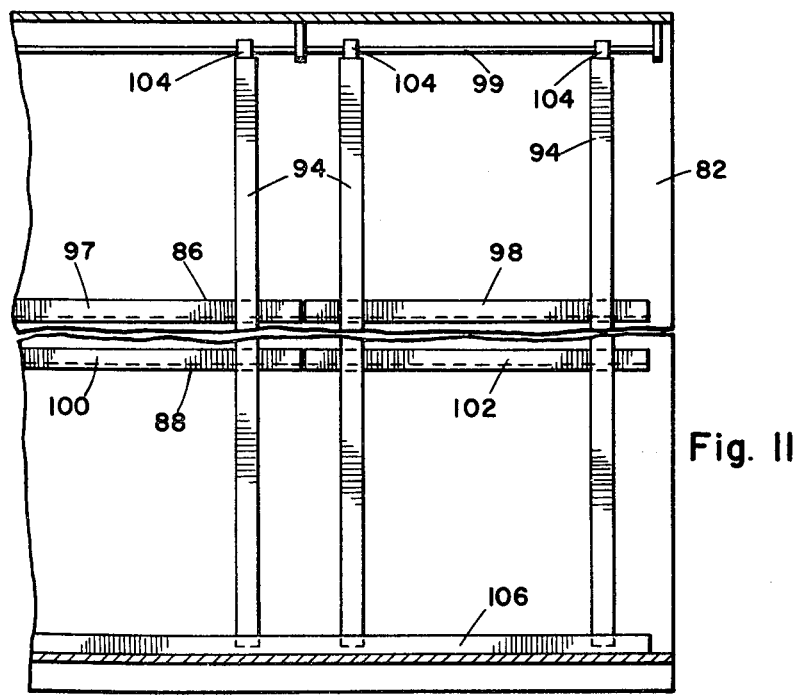
FIG. 11 is a sectional view taken on line 11—11 of FIG. 10.

Referring now to FIGS. 10 and 11, there is illustrated a second embodiment of the supporting structure of the invention. The figures show a body portion 72 of a vehicle which has sufficient height to accommodate three levels of carts. The vehicle body portion might, for example, be the trailer of a semi-trailer vehicle. The outboard track members 74 and 76 on one side and 78 ad 80 on the other side, are mounted directly to the side walls 82 and 84 respectively, of the vehicle body portion. The inboard tracks 86 and 88 on the one side and 90 and 92 on the other are carried on vertical members 94 and 96 respectively. There are a plurality of supporting members along the longitudinal length of the vehicle body as can be seen in FIG. 11. The track members may be broken up into a plurality of sections for ease of handling and two such sections are illustrated in FIG. 11, the track 86 comprising sections 97 and 98 and the track 88 comprising sections 100 and 102. The tracks of FIG. 11 are shown in the supporting position with the vertical support member 94 being carried by a longitudinal retainer bar 99. The vertical member is carried on the bar by a hook member 104 and the lower end of the vertical support member is restrained from side to side motion by a retaining channel 106. Similarly, the phantom line shows the supporting position for vertical support member 96 being carried on a retaining bar 108 and received in a retaining channel 110. In the stowed position, which is illustrated by the right hand full line view of vertical support member 96, the vertical support member is carried on a longitudinal storage bar 107 which is elevated a distance relative to longitudinal bar 108 to provide clearance for the track members 90 and 92, so that they nest within side mounted tracks 80 and 78 respectively. In the stowed location, the vertical support members are prevented from side to side movement by a storage rib 112. Similarly, the vertical support members 94 are prevented from the same side to side movement by storage ribs 114.

it sufficient vehicle width was available for three rows of carts, additional tracks could be carried on the vertical support members so as to provide support for centrally located levels of carts. However, in the illustrated embodiment, the vehicle width is insufficient to allow for that quantity of carts, and the central portion of the vehicle is therefore available for the storage of conventional cargo. The stowed position of the support members is intended to make substantially the entire vehicle interior available for such conventional cargo, or, as illustrated, the vehicle can be operated with one series of container supports in place and the other stowed.

Figure 8:
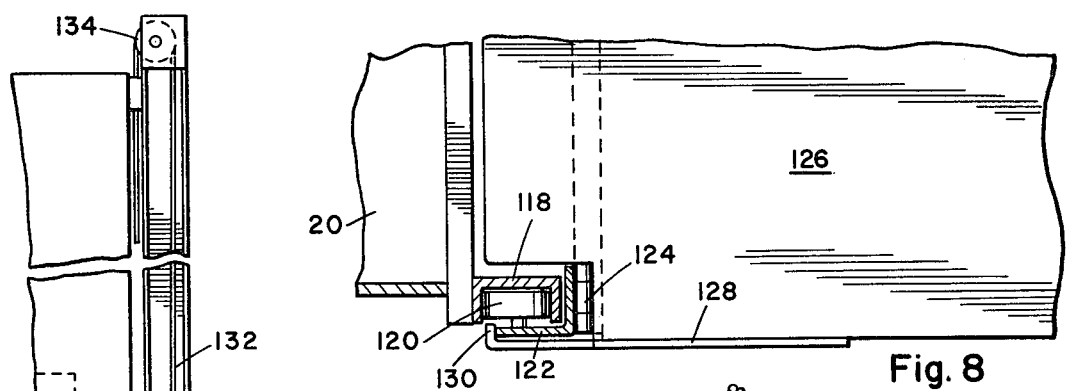
FIG. 8 is an enlarged sectional view taken on line 8—8 of FIG. 7.
Figure 9:
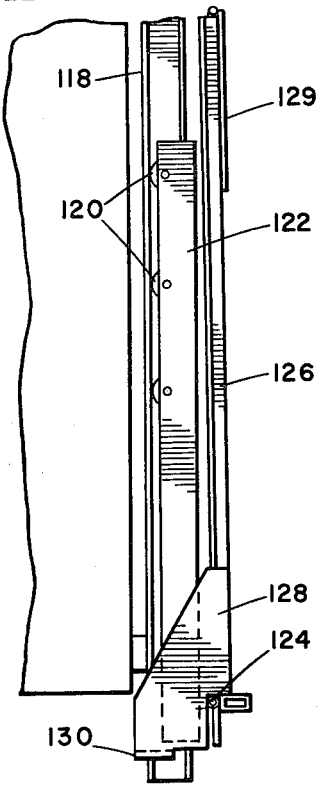
FIG. 9 is a view similar to a portion of FIG. 7, showing the elevator platform folded.
Figure 7:
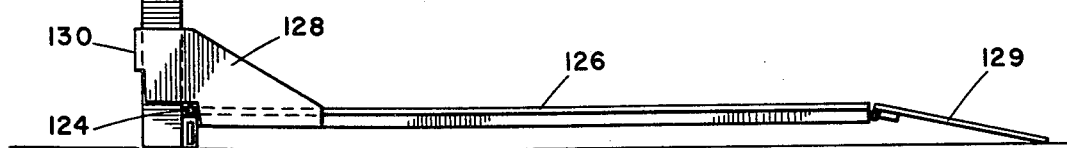
FIG. 7 is a side elevation view of the external cart elevator.

Referring now to FIGS. 7 through 9, there is illustrated a loading elevator mechanism which is utilizable with both embodiments of the invention. The elevator mechanism, indicated generally at 116, includes a plurality of tracks 118, mounted at either side of the rear entrance portion to the vehicle body. The tracks comprise generally U-shaped members with their open sides facing outward. The tracks receive rotatably a plurality of wheel 120 carried on frame 122. The frame is connected through a hinge 124 to the cart receiving platform 126.

The platform has an extended position, which is illustrated in FIG. 7, and is maintained in a horizontal position by a flange 128 carrying a stop 130, which engages frame 122 to prevent travel of the platform past the horizontal position. Transition of a wheeled cart, for example, from the ground or other flat surface, is accomplished through the use of a pivotally attached ramp 129. For stowage, the platform is raised from its horizontal position to a vertical position, illustrated in FIG. 9, and retained by suitable latches or locks (not shown). Ramp 129 also is in a vertical orientation when stowed and the elevator frame is raised to the position illustrated so as to provide adequate ground clearance for the vehicle.

The elevator is raised or lowered through the use of a plurality of cables 132 affixed to frame 122 that travel vertically upward to pulleys 134 and then down to a hoist mechanism (not shown) such as a hydraulic jack or electric winch. For convenience this jack or winch may be located under the truck body.

Referring again to FIG. 4, the elevator platform 126 is illustrated in an elevated position adjacent a track member 44. Without special provision, there exists a gap between the end of the platform 126 and the beginning of the track 144 which would make it difficult, or impossible, to roll a wheeled container from the platform to the tracks. The gap is necessary to provide clearance for the roll top door or other door type which is carried in track 136. A transition ramp 138 is provided to bridge the gap, and has a retracted position, shown in solid lines, in which its outboard end 140 is clear of the tracks for the roll top door. It may be extended by sliding along supporting track 44 so as to come in juxtaposition with the platform.

In use, an empty vehicle, incorporating the structure of the invention, is backed up to the immediate proximity of the loading area and the elevator platform, moved from its vertical or stowed position, to its horizontal position. The elevator platform is then raised or lowered so as to bring it to an appropriate level for loading. In facilities utilizing a loading dock, the elevator level would be at dock level, or if desired the truck may be backed up against the dock and the elevator utilized at slightly above dock level. If the facility being serviced has no loading dock, the elevator is lowered to its lowest position, in proximity to the ground, and the ramp 129 lowered into ground contact. This is the position illustrated in FIG. 7. The wheeled carts may then be rolled onto the platform and arranged side by side in approximate alignment with the center line between opposing pairs of tracks. When the carts are in position, the elevating mechanism is actuated, and the platform raised to, for example, the highest level. The transition ramp is then extended to the immediate proximity of the terminal end of the platform, and the carts may be rolled onto the track members. The elevator is then lowered, and the process repeated, with the carts being added to each level, being used to force the existing carts on that level further within the vehicle body until the level is entirely full of carts. The remaining levels of tracks, including the floor level, are then filled with carts.

Withe the vehicle at capacity, the transition ramps are moved to their retracted position and the roll top door lowered and secured. The elevator platform may then be raised to its vertical or stowed position and latched in that position. Finally, the elevator is raised to the ground clearing position illustrated in FIG. 9.

When filled in the described manner, the embodiment of the invention illustrated in FIG. 2 would have two levels and three rows of carts, each row containing three carts so that the entire vehicle capacity would be 18 carts. The modification of FIG. 3 would reduce the vehicle capacity to 12 carts but would provide for the carrying of considerable conventional cargo between the two track support structures. The embodiment illustrated in FIG. 10 provides for three levels of carts in two rows and also has a considerable vehicle volume available for conventional cargo between the vertical support members 94 and 96.

The unloading of the vehicle proceeds in a manner substantially similar to the reverse of the loading process, and when emptied of wheeled containers, the vehicle is ready for an additional load, or may be converted to a substantially open configuration for the transporting of conventional cargo.

The conversion from containers to conventional cargo is accomplished, with the supporting structure illustrated in FIGS. 1 through 6, in a most efficient and expeditious manner without the use of any tools. Each section of track and associated track support members is lowered from its supporting position to its stowed position by first retracting extension 34 within the legs, and then pivoting the legs into alignment with the track supporting members. The track supporting member and associated parts may then be lowered into the vertical or stowed position, as is illustrated in the full line view of FIG. 5. Each succeeding track on both sides of the vehicle is lowered in a similar manner, until all sections are lowered. The vehicle interior is then substantially clear, and very little volume reduction is experienced, so that substantially the original cargo capacity of the vehicle is retained.

The operation of the second embodiment of the invention illustrated in FIGS. 10 and 11 involves the movement of the vertical support members from the supporting position to their stowed position. The track members are sectioned along their length so as to break the total length of the track up into manageable segments. The operator merely raises the section upon which he is working, a sufficient distance for the hook to clear the supporting bar and the bottom end portion of the vertical member to clear the retaining channel. The section is then moved toward the center of the vehicle where it may be pivoted about its lower end to allow the hook 104 to clear the supporting bar. The entire structure is then moved to the side and the hook member again raised a sufficient distance so that the end portion clears the storage rib, whereupon the hook member is lowered into engagement with the storage bar. The operation is continued in a similar manner for all segments, on both sides of the vehicle, until the entire track portion is in the stowed position and the vehicle is substantially unobstructed throughout its entire volume. It is then possible to carry substantially the original capacity of the vehicle in conventional cargo.

Having described my invention, I now claim:

1. A vehicle loading and storage system for loading and storing containers within the body of a vehicle comprising:
   track means for storing at least one additional level of containers above a level of containers supported on the floor of said vehicle body;
   elevator means for raising containers from at least the floor level of said vehicle to said additional level;
   said track means having at least one row;
   each of said rows being capable of supporting a plurality of containers;
   said track means having a supported position and a stowed position;
   said stowed position making substantially the entire interior of said vehicle open for cargo;
   at least one of said track means is retained in said supporting position by a plurality of vertical members removably secured to an overhead bar mounted along the roof of said vehicle;
   at least one track of said track means is supported in said stowed position by said plurality of vertical members removably secured to at least one overhead bar mounted along the roof of said vehicle adjacent at least one side thereof;
   said track means comprise at least one pair of channels;
   the first channel in said pair being carried by a side wall of said vehicle body;
   and the second channel in said pair being carried by said vertical member,
   said vertical members are prevented from side to side movement within said vehicle body when in said supporting position, by a retainer mounted on the floor of said vehicle.

2. The system of claim 1 wherein,
   said retainer comprises a channel mounted longitudinally of said body of said vehicle.

3. A vehicle loading and storage system for loading and storing containers within the body of a vehicle comprising:
   track means for storing at least one additional level of containers above a level of containers supported on the floor of said vehicle body;
   elevator means for raising containers from at least the floor level of said vehicle to said additional level;
   said track means having at least one row;
   each of said rows being capable of supporting a plurality of containers;
   said track means having a supported position and a stowed position;
   said stowed position making substantially the entire interior of said vehicle open for cargo;
   at least one of said track means is retained in said supporting position by a plurality of vertical members removably secured to an overhead bar mounted along the roof of said vehicle;
   at least one track of said track means is supported in said stowed position by said plurality of vertical members removably secured to at least one overhead bar mounted along the roof of said vehicle adjacent at least one side thereof;
   said track means comprise at least one pair of channels;

the first channel in said pair being carried by a side wall of said vehicle body;

the second channel in said pair being carried by said vertical member;

said vertical members are prevented from side to side movement within said body of said vehicle when in the stowed position by a storage rib mounted longitudinally of said body on said floor of said body.

4. The system of claim 3 wherein, said overhead bars carrying said vertical members in said stowed position are higher than said overhead bars carrying said vertical members in said supporting position.

* * * * *